(12) United States Patent
Cipriani et al.

(10) Patent No.: US 11,421,405 B2
(45) Date of Patent: *Aug. 23, 2022

(54) VESSEL RINSING APPARATUS

(71) Applicant: Delta Faucet Company, Indianapolis, IN (US)

(72) Inventors: Mark Cipriani, Carmel, IN (US); Anthony Joseph Tentler, Windfall, IN (US); Jack William Judge, Indianapolis, IN (US); Thad J. Eads, Urbana, IN (US); Michael Scot Rosko, Greenwood, IN (US); Raoul Labrie, Shelbyville, IN (US); Alejandra Lazarini, Carmel, IN (US); Michael J. Veros, Carmel, IN (US)

(73) Assignee: Delta Faucet Company, Indianapolis, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/167,647

(22) Filed: Feb. 4, 2021

(65) Prior Publication Data

US 2021/0156125 A1    May 27, 2021

Related U.S. Application Data

(63) Continuation of application No. 16/131,035, filed on Sep. 14, 2018, now Pat. No. 10,914,056.

(51) Int. Cl.
| | |
|---|---|
| *B08B 9/34* | (2006.01) |
| *E03C 1/04* | (2006.01) |
| *B05B 12/00* | (2018.01) |
| *B05B 1/28* | (2006.01) |

(52) U.S. Cl.
CPC .............. *E03C 1/0404* (2013.01); *B05B 1/28* (2013.01); *B05B 12/002* (2013.01); *B08B 9/34* (2013.01)

(58) Field of Classification Search
None
See application file for complete search history.

(56) References Cited

U.S. PATENT DOCUMENTS

| | | |
|---|---|---|
| 708,844 A | 9/1902 | Sweeney |
| 737,247 A | 8/1903 | Krammerer |
| 784,755 A | 3/1905 | Pein |
| 6,612,507 B1 | 9/2003 | Meyer et al. |
| 8,646,476 B2 | 2/2014 | Thomas et al. |

(Continued)

FOREIGN PATENT DOCUMENTS

| | | |
|---|---|---|
| BE | 896360 | 8/1983 |
| FR | 624156 A | 7/1927 |

(Continued)

OTHER PUBLICATIONS

U.S. Appl. No. 16/997,089, filed Aug. 19, 2020, titled "Vessel Rinsing Apparatus, Drain Receptacle, Interchangeable Nozzle Assembly, and Faucet System Including Same."

(Continued)

*Primary Examiner* — Cristi J Tate-Sims
(74) *Attorney, Agent, or Firm* — Bose McKinney & Evans LLP

(57) ABSTRACT

A vessel rinsing apparatus including a mounting base, a fluid discharge member including a plurality of nozzles, a valve member operably coupled to the fluid discharge member and configured to control water flow through the nozzles, and an escutcheon supported by the mounting base.

24 Claims, 12 Drawing Sheets

(56) References Cited

U.S. PATENT DOCUMENTS

| | | |
|---|---|---|
| 10,914,056 B2 | 2/2021 | Cipriani et al. |
| 2004/0060109 A1 | 4/2004 | Hensley |
| 2004/0168711 A1 | 9/2004 | Dickson et al. |
| 2008/0142095 A1 | 6/2008 | Van Der Linden |
| 2011/0061754 A1 | 3/2011 | Thomas et al. |
| 2014/0215709 A1 | 8/2014 | Nightlinger et al. |
| 2014/0283877 A1 | 9/2014 | Sonoda |
| 2017/0162427 A1 | 6/2017 | Gleissner et al. |
| 2017/0172369 A1 | 6/2017 | Gonzalez et al. |
| 2018/0092505 A1 | 4/2018 | Simon |
| 2020/0087899 A1 | 3/2020 | Cipriani et al. |
| 2021/0052131 A1 | 2/2021 | Cipriani et al. |

FOREIGN PATENT DOCUMENTS

| | | |
|---|---|---|
| FR | 2543426 | 5/1984 |
| FR | 2704782 A1 | 11/1994 |
| GB | 262372 | 12/1926 |
| GB | 264756 | 1/1927 |
| KR | 101765550 B1 | 8/2017 |

OTHER PUBLICATIONS

Espacenet translation FR2543426A3, Drainer for drinking glasses (Year: 1983).

VESSEL RINSING APPARATUS

CROSS-REFERENCE TO RELATED APPLICATION

The present application is a continuation of U.S. patent application Ser. No. 16/131,035, filed Sep. 14, 2018, the disclosure of which is expressly incorporated herein by reference

BACKGROUND AND SUMMARY OF THE DISCLOSURE

The present invention related generally to a fluid dispensing system and, more particularly, to a vessel rinsing apparatus for use with fluid vessels or receptacles, such as cups or glasses.

The interior of glasses, cups, and other small vessels or containers are often difficult to clean by removing dirt and debris after use. Conventional bottle brushes, sponges, rags and other disposable materials are often used to clean such small vessels but may not be effective, for example, as being incapable of fitting inside the vessel, and do not provide water for rinsing. In addition, typical faucets lack directional pressurized water flow required to adequately remove dirt and debris from extremities within the interiors of small vessels.

There remains a need for a vessel rinsing apparatus capable of being installed in a standard countertop opening, or integrated as part of a faucet escutcheon, which allows for the cleaning of small vessels, such as glasses and cups.

According to an illustrative embodiment of the present disclosure, a vessel rising apparatus includes a mounting base having an upper coupler and a downwardly extending mounting shank defining an opening extending along a longitudinal axis. The upper coupler is configured to be supported above an upper surface of a mounting deck, and the mounting shank is configured to extend through a mounting aperture formed within the mounting deck. A fluid discharge member includes a central body supporting a plurality of nozzles and a trigger extending outwardly from the central body. The central body is received with the opening of the mounting shank and is moveable along the longitudinal axis. A valve shaft is operably coupled to the fluid discharge member and is configured to move with the trigger to control water flow through the central body to the plurality of nozzles. An escutcheon is supported by the upper coupler of the mounting base and includes an upwardly extending wall defining a drain bowl, and a drain channel extending through the upwardly extending wall. The drain channel is configured to provide fluid communication between the drain bowl and a sink basin supported by the mounting deck.

According to another illustrative embodiment of the present disclosure, a vessel rinsing apparatus includes a mounting base having a downwardly extending mounting shank defining an opening extending along a longitudinal axis. The mounting shank is configured to extend through a mounting aperture formed within a mounting deck. A fluid discharge member includes a central body supporting a plurality of nozzles and a trigger extending outwardly from the central body. The central body is received within the opening of the mounting shank and is moveable along the longitudinal axis. A valve shaft is operably coupled to the fluid discharge member and is configured to move with the trigger to control water flow through the central body to the plurality of nozzles. A removable plate is supported by the trigger of the fluid discharge member. The removable plate includes one of a strainer having a base and a plurality circumferentially spaced drain openings, and an elastomeric brush having a plurality of upwardly extending cleaning projections and a plurality of drain openings positioned intermediate adjacent ones of the cleaning projections.

According to further illustrative embodiment of the present disclosure, a vessel rinsing apparatus includes a mounting base having an upper plate and a downwardly extending mounting shank defining an opening extending along a longitudinal axis, the upper plate configured to be supported above an upper surface of the mounting deck, and the mounting shank configured to extend through a mounting aperture formed within the mounting deck. A fluid discharge member includes a central body supporting a plurality of nozzles and a trigger extending outwardly from the central body. The central body is received within the opening of the mounting shank and is moveable along the longitudinal axis. A valve shaft is operably coupled to the fluid discharge member and is configured to move with the trigger to control water flow through the central body to the plurality of nozzles. An escutcheon is supported by the mounting base and includes an upwardly extending wall and a drain channel extending through the upwardly extended wall, wherein the upper plate of the mounting face and the upwardly extending wall of the escutcheon define a drain bowl. The drain channel is configured to provide fluid communication between the drain bowl and a sink basin supported by the mounting deck. A removable plate is supported by the trigger of the fluid discharge member.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

Figure 1:
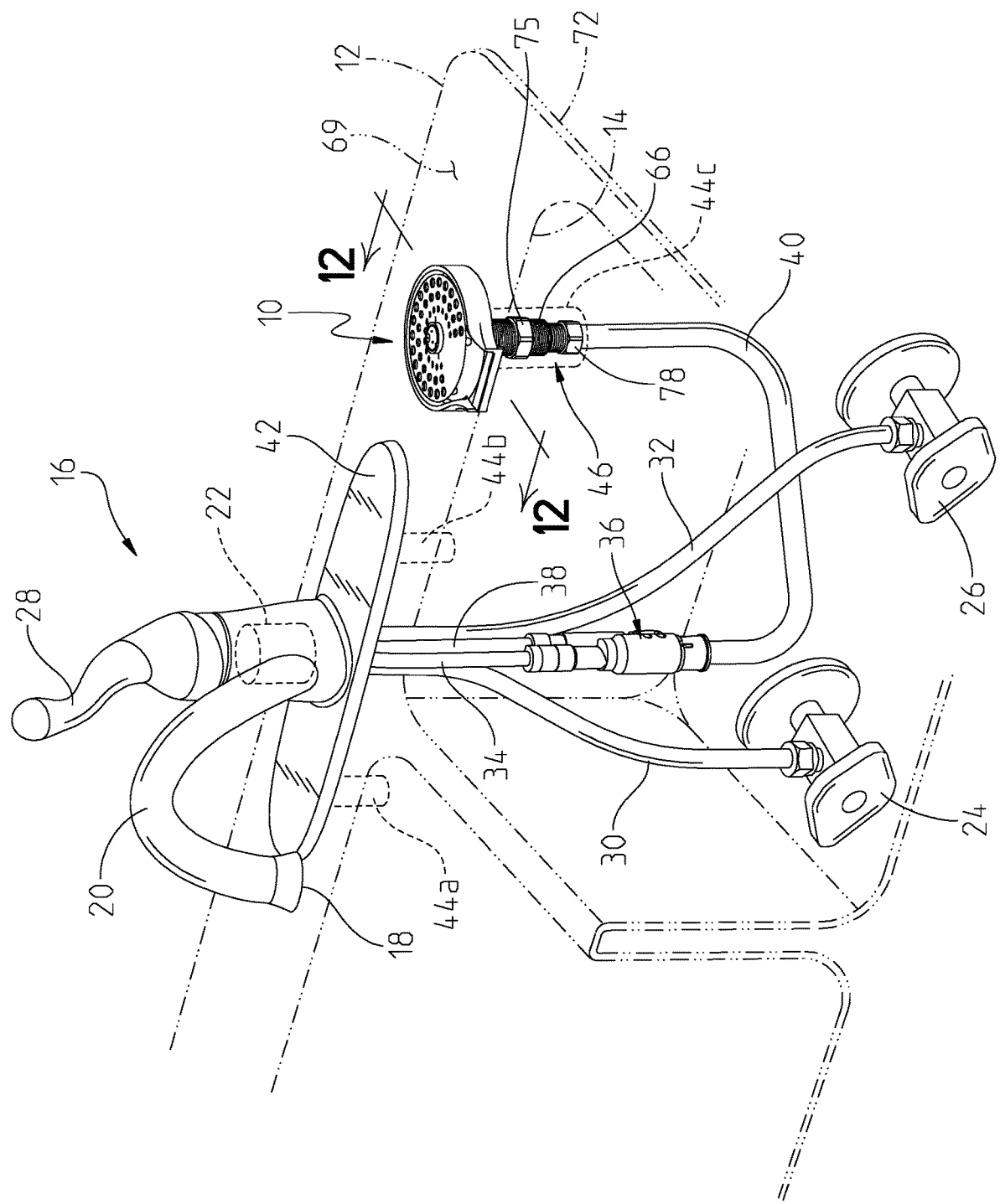
FIG. 1 is a perspective view of an illustrative vessel rinsing apparatus mounted to a sink deck and fluidly coupled to a faucet.

For the purposes of promoting an understanding of the principles of the present disclosure, reference will now be made to the embodiments illustrated in the drawings, which are described herein. The embodiments disclosed herein are not intended to be exhaustive or to limit the invention to the precise form disclosed. Rather, the embodiments are chosen and described so that others skilled in the art may utilize their teachings. Therefore, no limitation of the scope of the claimed invention is thereby intended. The present invention includes any alterations and further modifications of the illustrated devices and described methods and further applications of principles in the invention which would normally occur to one skilled in the art to which the invention relates.

Figure 2:
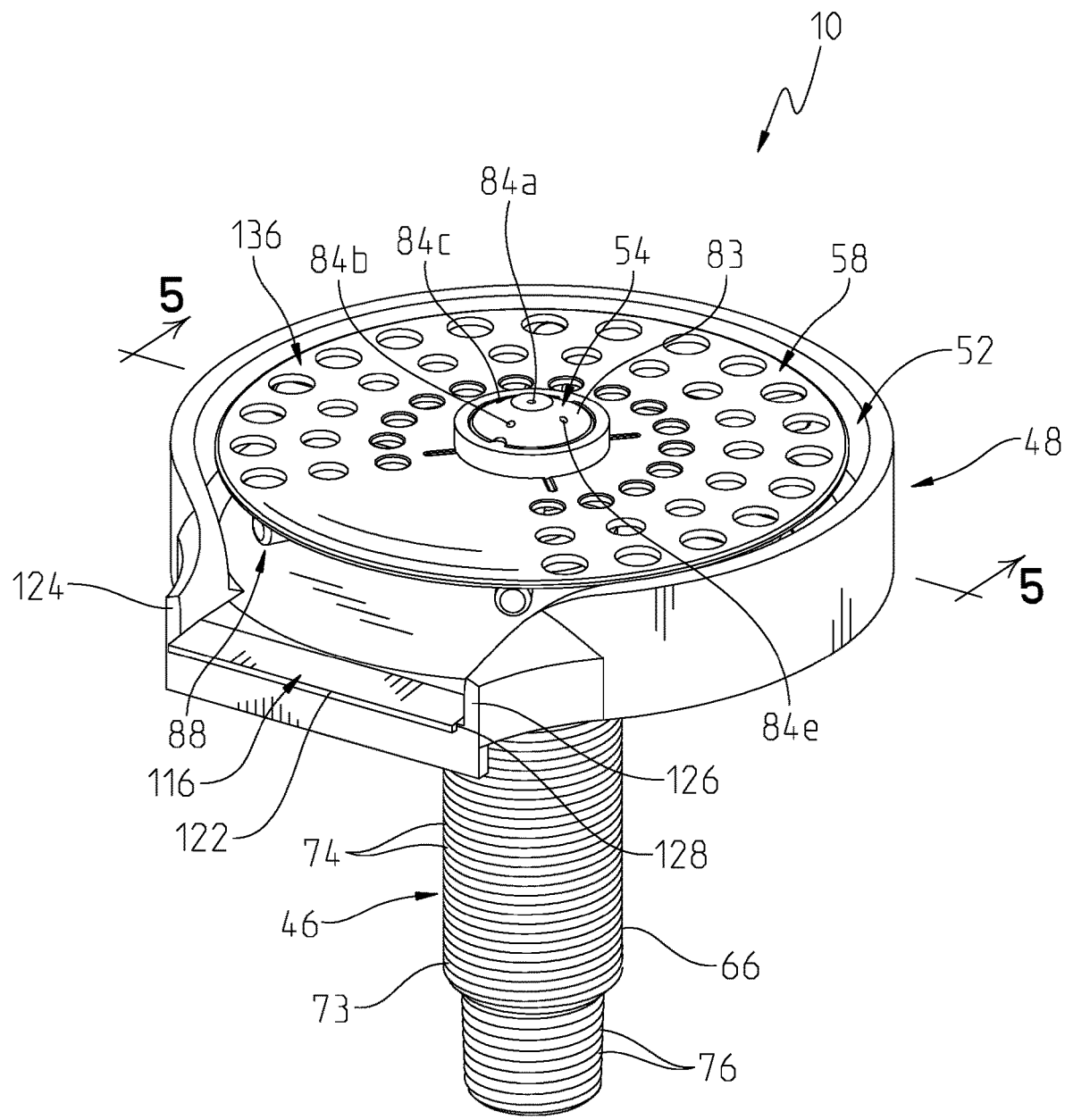
FIG. 2 is a perspective view of the vessel rinsing apparatus of FIG. 1.

With reference initially to FIGS. 1 and 2, an illustrative vessel rinsing apparatus 10 is shown supported by a conventional mounting deck, such as a sink deck 12 supporting a sink basin 14. A faucet 16 may be supported by the sink deck 12 for discharging water from a water outlet 18 into the sink basin 14. The faucet 16 may be of conventional design, including a delivery spout 20 defining the water outlet 18, and a manual mixing valve 22 for controlling water flow from a hot water supply 24 and a cold water supply 26 to the water outlet 18. The mixing valve 22 includes a valve handle 28 to control the flow rate and the temperature of water delivered to the water outlet 18. A hot water supply tube 30 may fluidly couple the hot water supply 24 to a first inlet of the mixing valve 22, and a cold water supply tube 32 may fluidly couple the cold water supply 26 to a second inlet of the mixing valve 22. A mixed water outlet tube 34 may fluidly couple an outlet of the mixing valve 22 a diverter valve 36.

The diverter valve 36 illustratively controls (e.g., toggles) water flow between the outlet 18 of the delivery spout 20 and the vessel rinsing apparatus 10. An illustrative diverter valve 36 is detailed in U.S. Pat. No. 8,646,476, the disclosure of which is expressly incorporated by herein by reference. A spout outlet tube 38 fluidly couples the diverter valve 36 to the outlet 18, while a dispenser tube 40 fluidly couples the diverter valve 36 to the vessel rinsing apparatus 10. As such, the mixing valve 22 may be manipulated by the handle 28 to control the temperature and flow rate of water delivered to the active outlet(s) selected by the diverter valve 36 (e.g., the delivery spout outlet 18 and the glass rinsing apparatus 10). The various water tubes 30, 32, 34, 38 and 40 may be formed of a flexible polymer, such as a cross-linked polyethylene (PEX).

An escutcheon 42 may be positioned intermediate the sink deck 12 and the delivery spout 20. A plurality of mounting apertures 44 may extend within the sink deck 12, wherein at least some of the apertures 44a, 44b may be used to couple the faucet 16 to the sink deck 12. In the illustrative embodiment, the glass rinsing apparatus 10 is fixed to the mounting aperture 44c that would conventionally support a kitchen side sprayer (not shown) adjacent the sink basin 14. Such positioning facilitates draining of the vessel rinsing apparatus 10 into the sink basin 14.

Figure 3:
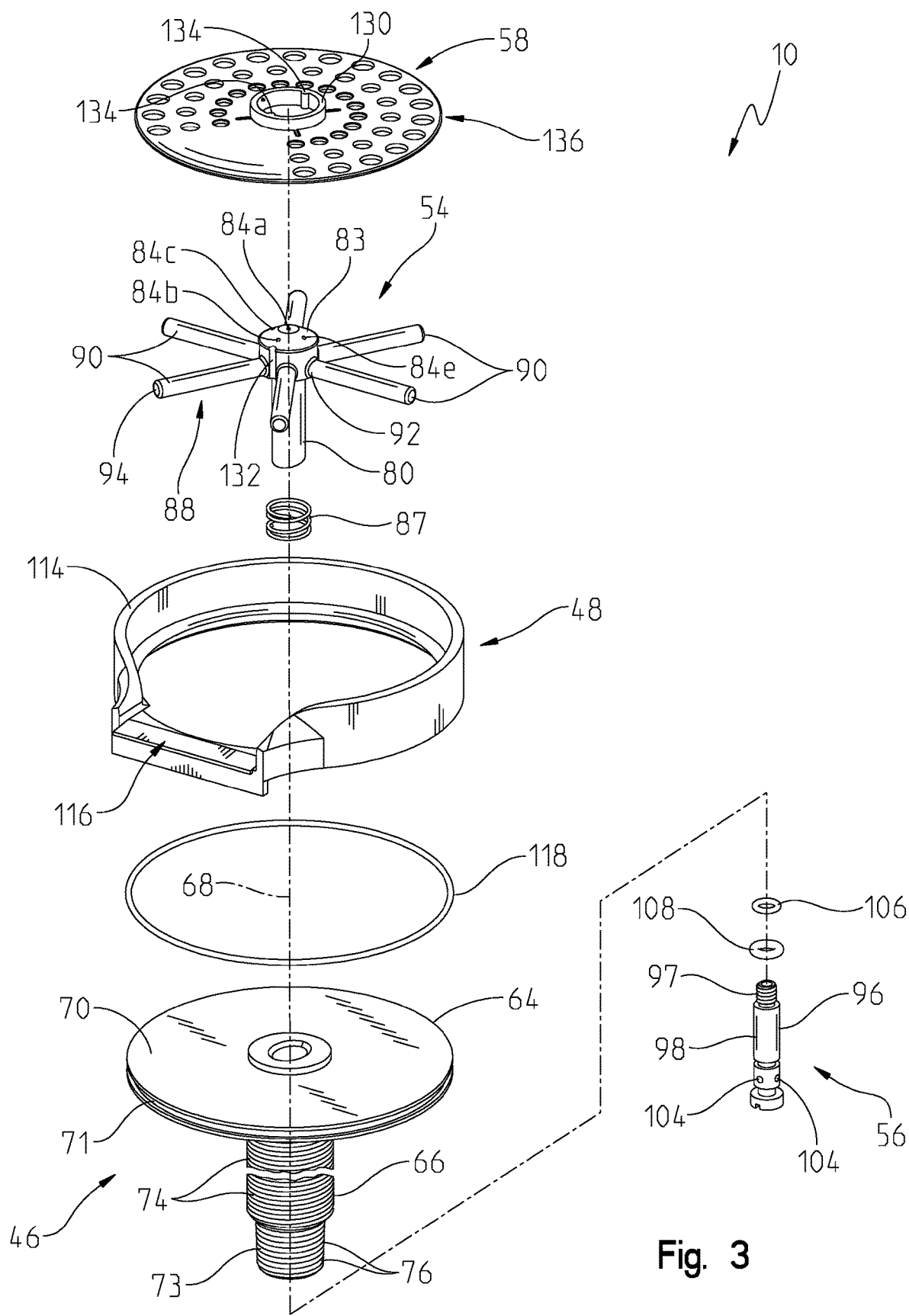
FIG. 3 is a top exploded perspective view of the vessel rinsing apparatus of FIG. 2.
Figure 4:
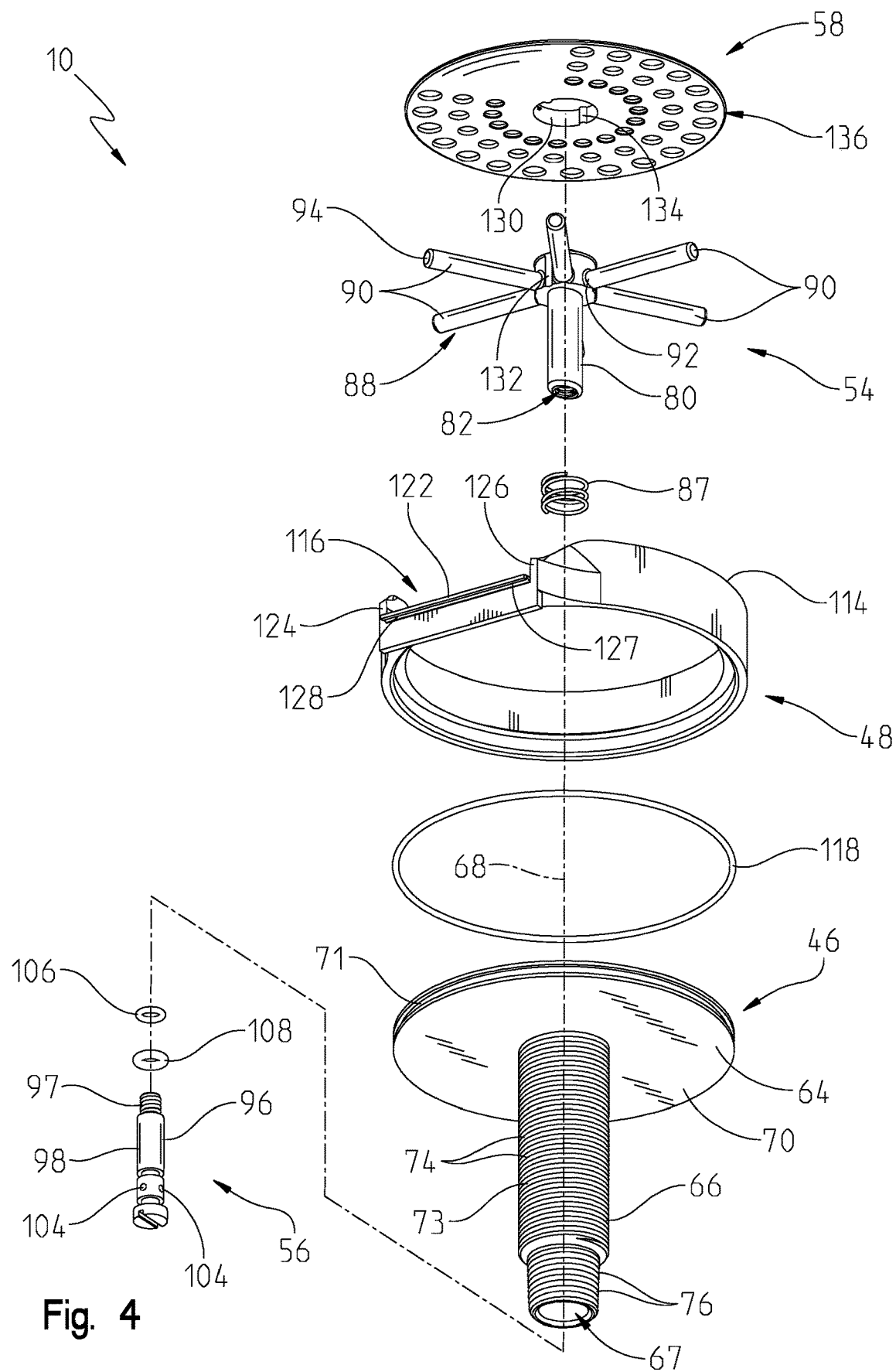
FIG. 4 is a bottom exploded perspective view of the vessel rinsing apparatus of FIG. 2.
Figure 5:
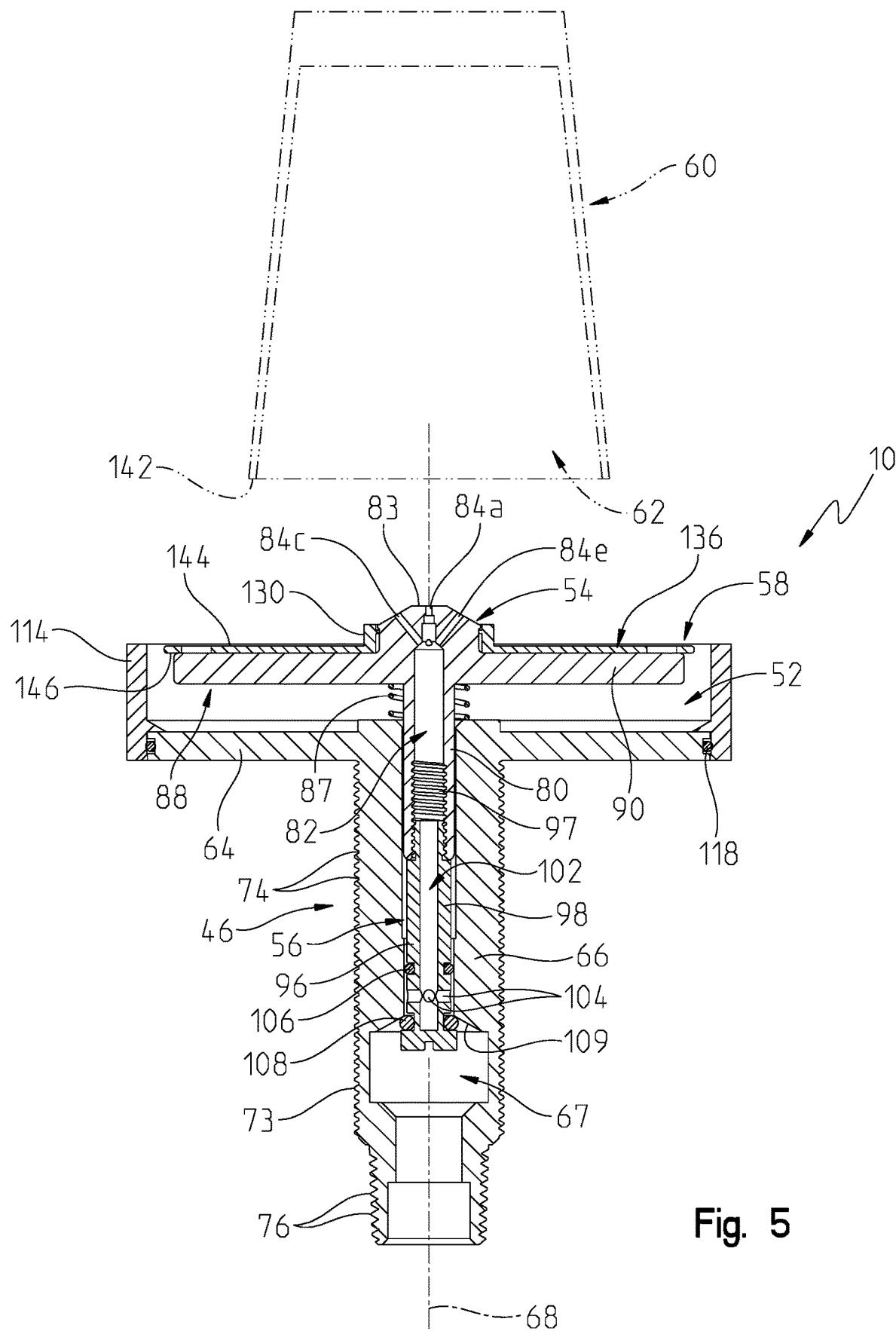
FIG. 5 is a cross-sectional view of the vessel rinsing apparatus taken along line 55 of FIG. 2, showing the discharge member in a closed position and a vessel shown in phantom.

With reference to FIGS. 2-4, the illustrative vessel rinsing apparatus 10 includes a mounting base 46 configured to be coupled to the sink deck 12. An escutcheon 48 illustratively cooperates with the mounting base 46 to define a contoured drain receptacle or bowl 52 for the collection and disposal of debris and wastewater. A fluid discharge member 54 is operably coupled to the mounting base 46 and to a valve member 56. A trigger plate 58 is supported by the fluid discharge member 54 and is configured to be engaged by a vessel 60 (e.g., a cup, glass or other container) for activating water flow through the fluid discharge member 54 and into an interior 62 of the vessel 60 (FIGS. 5 and 6).

The mounting base 46 illustratively includes an upper coupler, such as an upper plate 64, and a downwardly extending mounting shank 66 defining an opening 67 extending along a longitudinal axis 68. The upper plate 64 is configured to be supported above an upper surface 69 of the sink deck 12 and illustratively comprises a disk 70 having a circular peripheral edge 71. The mounting shank 66 is configured to extend through one of the mounting apertures 44c formed within the sink deck 12 and below a lower surface 72 of the sink deck 12. The mounting shank 66 illustratively includes a stepped cylindrical tube 73 having upper external threads 74 configured to threadably couple with a mounting nut 75 for securing the mounting base 46 to the sink deck 12 (FIG. 1). Illustratively, the dispenser tube 40 is fluidly coupled to the mounting shank 66 to provide water from a water supply (illustratively via the mixing valve 22 through the diverter valve 36). More particularly, the cylindrical tube 73 of the mounting shank 66 illustratively includes lower external threads 76 configured to engage with a fitting 78 to fluidly couple the dispenser tube 40 to the mounting shank 66 (FIG. 1).

With reference to FIGS. 3-6, the fluid discharge member 54 cooperates with the mounting base 50 to deliver water from the dispenser tube 40. The fluid discharge member 54 illustratively includes a central body 80 defining a fluid passageway 82 and having a sprayface 83 supporting a plurality of nozzles 84 in fluid communication with the fluid passageway 82. More particularly, the nozzles 84 may include a center nozzle 84a and a plurality of peripheral nozzles 84b, 84c, 84d, 84e positioned radially outward from the center nozzle 84a. It should be appreciated that the number and placement of the nozzles 84 may vary.

Figure 6:
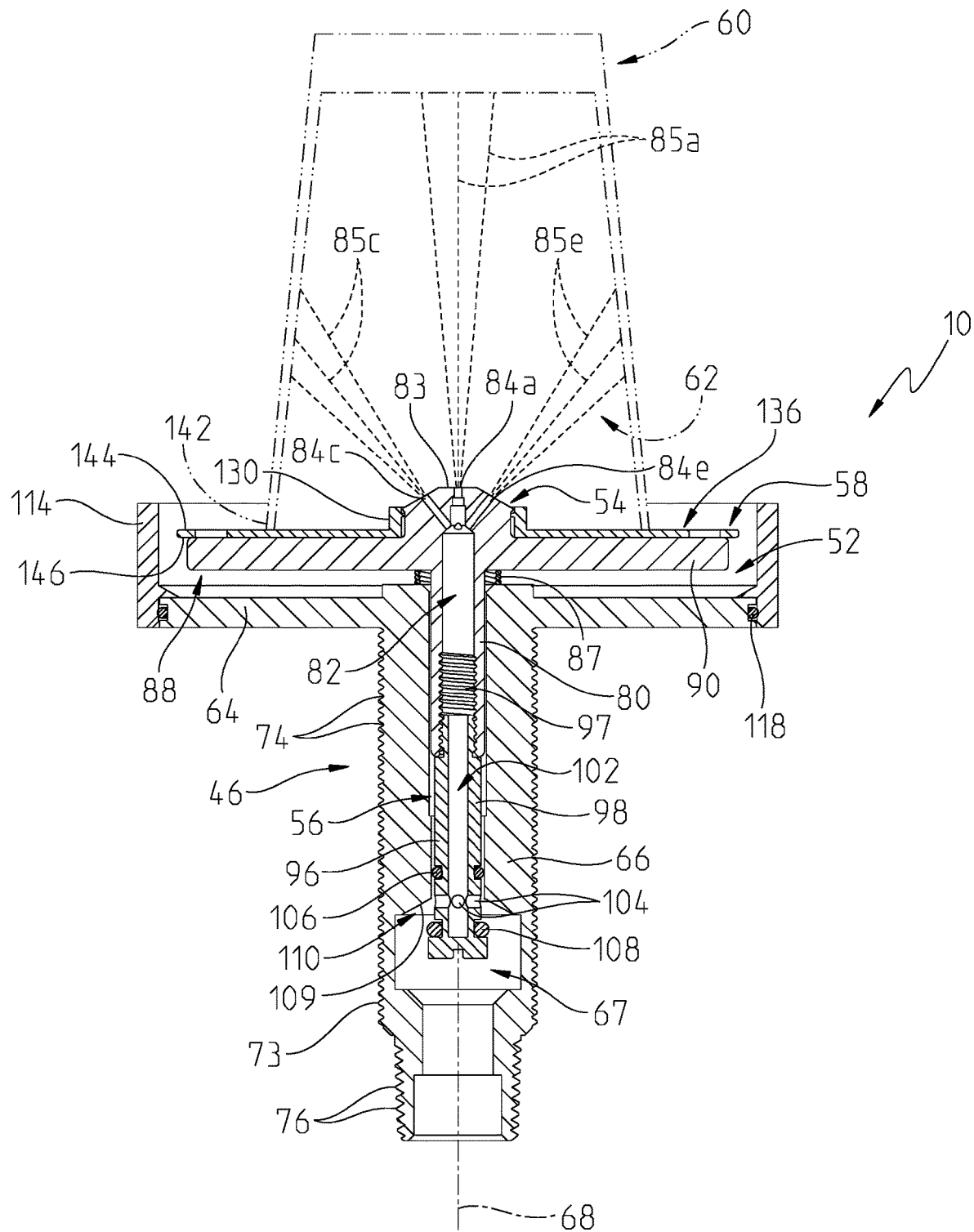
FIG. 6 is a cross-sectional view of the vessel rinsing apparatus similar to FIG. 5, showing the discharge member in an open position and a vessel shown in phantom.

In one illustrative embodiment, the nozzles 84 may be oriented to direct water in different desired positions within an interior 86 of the vessel 60, as represented by arrows 85 in FIG. 6. For example, the center nozzle 84a may be configured to discharge water upwardly parallel to the longitudinal axis 68. Illustratively, a first peripheral nozzle 84b may be oriented at a first angle from the longitudinal axis 68 for directing water to a distal corner of a mug, a second peripheral nozzle 84c may be oriented at a second angle from the longitudinal axis 68 for directing water to a distal corner of a highball glass, a third peripheral nozzle 84d may be oriented at a third angle from the longitudinal axis 68 for directing water to a distal corner of a tumbler or pint glass, and a forth peripheral nozzle 84e may be oriented at a fourth angle from the longitudinal axis 68 for directing water to a distal portion of a wine glass.

The central body 80 of the fluid discharge member 54 is slideably received within the opening 67 of the mounting shank 66 such that it is moveable along the longitudinal axis 68. More particularly, the fluid discharge member 54 is configured to move along the longitudinal axis 68 between a raised (or rest) position (FIG. 5), and a lowered (or active) position (FIG. 6). A spring 87 may cooperate with the mounting base 46 to bias the discharge member 54 to the upper position. The fluid discharge member 54 may be restrained from rotating relative to the mounting base 50. Illustratively, the central body 80 has an elongated cross section (e.g. oval) thereby preventing rotation within the opening 67. Other rotatable couplers, such as a key received within a keyway, may be substituted therefor.

A trigger 88 extends outwardly from the central body 80, The trigger 88 illustratively includes a plurality of radially outwardly extending arms or posts 90, each having a first end 92 supported by the central body 80 and a freely supported second end 94.

The valve member 56 illustratively comprises a valve pin or shaft 96 operably coupled to the fluid discharge member 54 (e.g., via a threaded coupling 97), and is configured to move with the trigger 88 to control water flow through the central body 80 to the plurality of nozzles 84. More particularly, the valve shaft 96 illustratively includes a hollow body 98 defining a fluid passageway 102 in fluid communication with the fluid passageway 82 of the central body 80 via radial openings 104. Upper and lower o-rings 106 and 108 are positioned above and below openings 104, respectively. The valve member 56 may be a separate component from the fluid discharge member 54, or formed integral therewith.

In the raised position as shown in FIG. 5, the valve shaft 96 blocks water flow from the fluid source (e.g., the mixing valve 22) to the nozzles 84. More particularly, the o-ring 108 seals against a valve seat 109 to prevent water flow from opening 67 to the fluid passageway 102. In the lowered position as shown in FIG. 6, the valve shaft 96 provides fluid communication between the fluid source and the nozzles 84. More particularly, a passageway 110 between the o-ring 108 and the valve seat 109 permits water flow therethrough from opening 67 to fluid passageway 102 through openings 104, and through the fluid passageway 82 to the nozzles 84.

Figure 12:
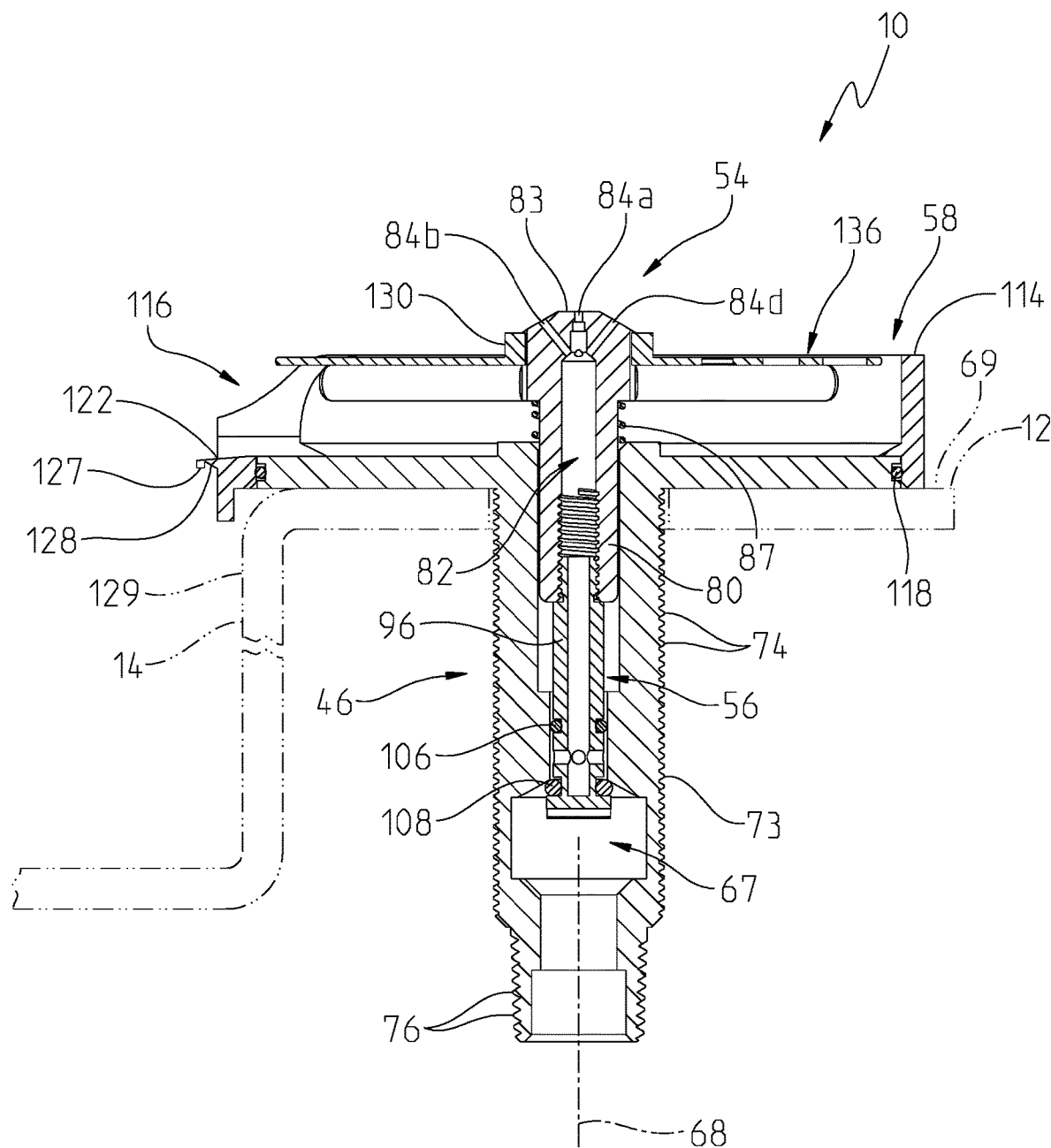
FIG. 12 is a cross-sectional view of the vessel rinsing apparatus taken along line 12-12 of FIG. 1, showing the drain channel in fluid communication with a sink basin.

The escutcheon 48 is supported by the mounting base 50 and illustratively includes an upwardly extending wall 114 and a drain channel 116 extending through the upwardly extending wall 114. As shown in FIGS. 1 and 12, the drain channel 116 is configured to provide fluid communication between the drain bowl 52 and the sink basin 14 supported by the sink deck 12. The upper plate 64 of the mounting base 50 and the upwardly extending wall 114 of the escutcheon 42 illustratively define the drain bowl 52. An o-ring 118 is illustratively supported by the peripheral edge 71 of the upper plate 64 to releasably retain the escutcheon 48 to the mounting base 50. As such, the escutcheon 48 may be exchanged with other escutcheons with different aesthetic shapes, finishes and/or drain channel 116 dimensions.

The drain channel 116 illustratively includes a lower wall 122 and opposing side walls 124 and 126. A lip 127 and an associated undercut 128 formed in a lower surface of the lower wall 122 prevents wastewater flowing through the drain channel 116 from running back toward the rear wall 129 of the sink basin 14. More particularly, the undercut 128 cooperates with the lip 127 to direct water downward.

In an illustrative embodiment, the trigger plate 58 is removably supported by the trigger 88 of the fluid discharge member 54 above the drain bowl 52. More particularly, the removeable trigger plate 58 is illustratively supported by the arms 90 of the trigger 88. Illustratively, a retaining ring 130 concentrically receives and frictionally engages the body 80 to releasably secure the trigger plate 58 to the fluid discharge member 54. The removable trigger plates 58 can be cleaned, replaced and/or exchanged with other trigger plates 58 that may have different cleaning benefits (e.g., characteristics of a brush or sponge).

Anti-rotation members may be configured to prevent rotation of the removeable trigger plate 58 about the longitudinal axis 68 relative to the fluid discharge member 54. The anti-rotation members may comprise a recess 132 supported by the fluid discharge member, and cooperating tabs 134 supported by the removeable trigger plate 58.

Figure 7:
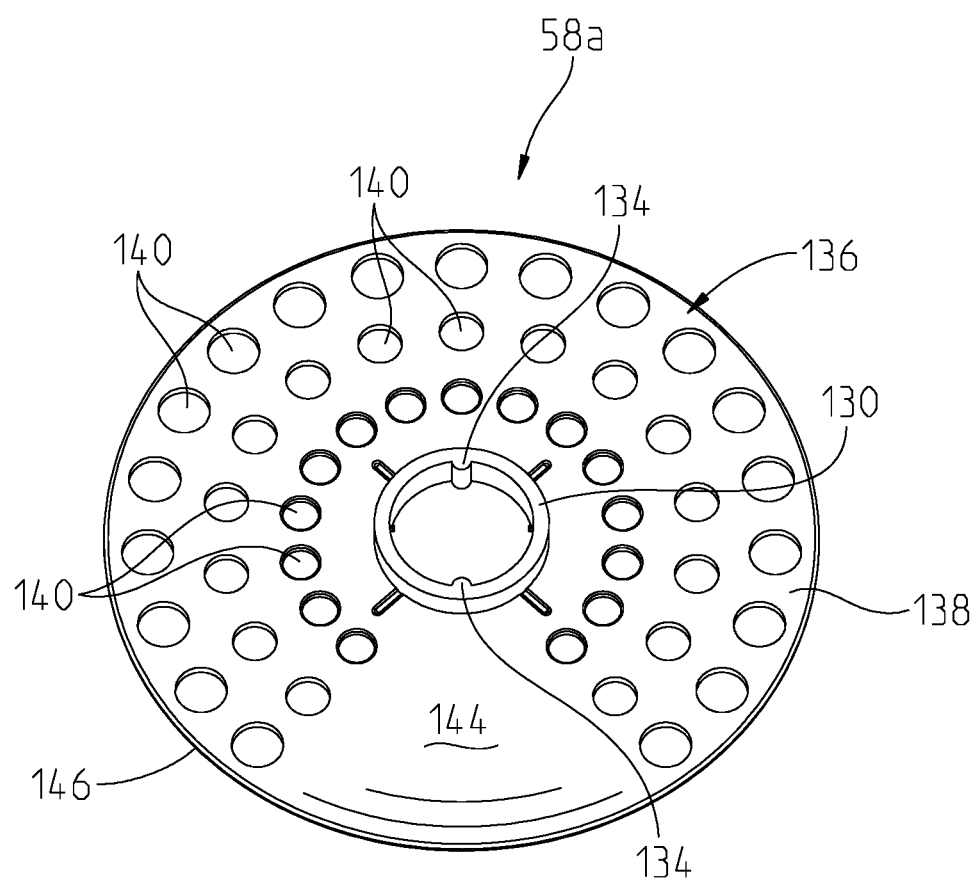
FIG. 7 is a perspective view of a first removable plate of the vessel rinsing apparatus of FIG. 2 in the form of a strainer.

With reference to FIG. 7, a first removeable trigger plate 58a may comprise a strainer 136 including a base 138 and a plurality of circumferentially spaced drain openings 140 arranged in a plurality of radially spaced rows. As a rim 142 of the glass 60 contacts the upper surface 144 of the strainer 136, a lower surface 146 of the strainer 136 engages the trigger 88 (FIGS. 5 and 6).

Figure 8:
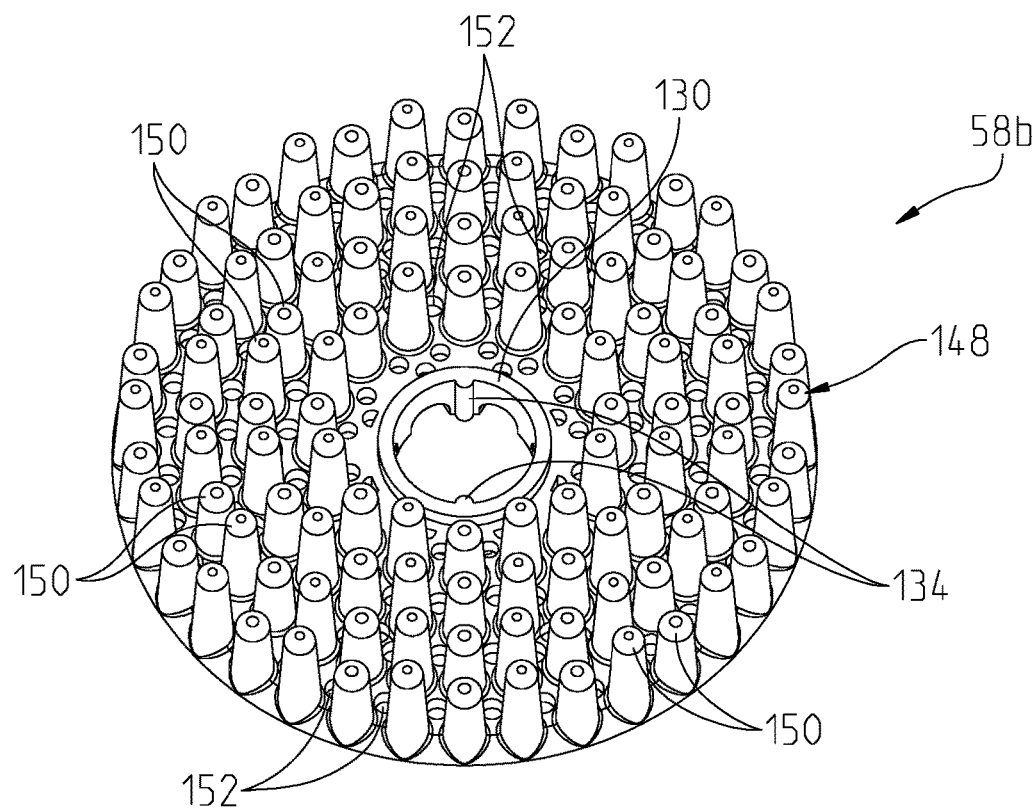
FIG. 8 is a perspective view of a second removable plate of the vessel rinsing apparatus of FIG. 2 in the form of a cleaning brush, with a plurality of first cleaning projections.

As shown in FIG. 8, a second removeable trigger plate 58b may comprise an elastomeric brush 148 including a plurality of upwardly extending projections or pegs 150 and a plurality of drain openings 152 positioned intermediate adjacent cleaning projections 150. The rim 142 of the glass 60 is configured to be received between adjacent cleaning projections 150 to assist in cleaning the inner and outer surfaces of the rim 142.

Figure 9:
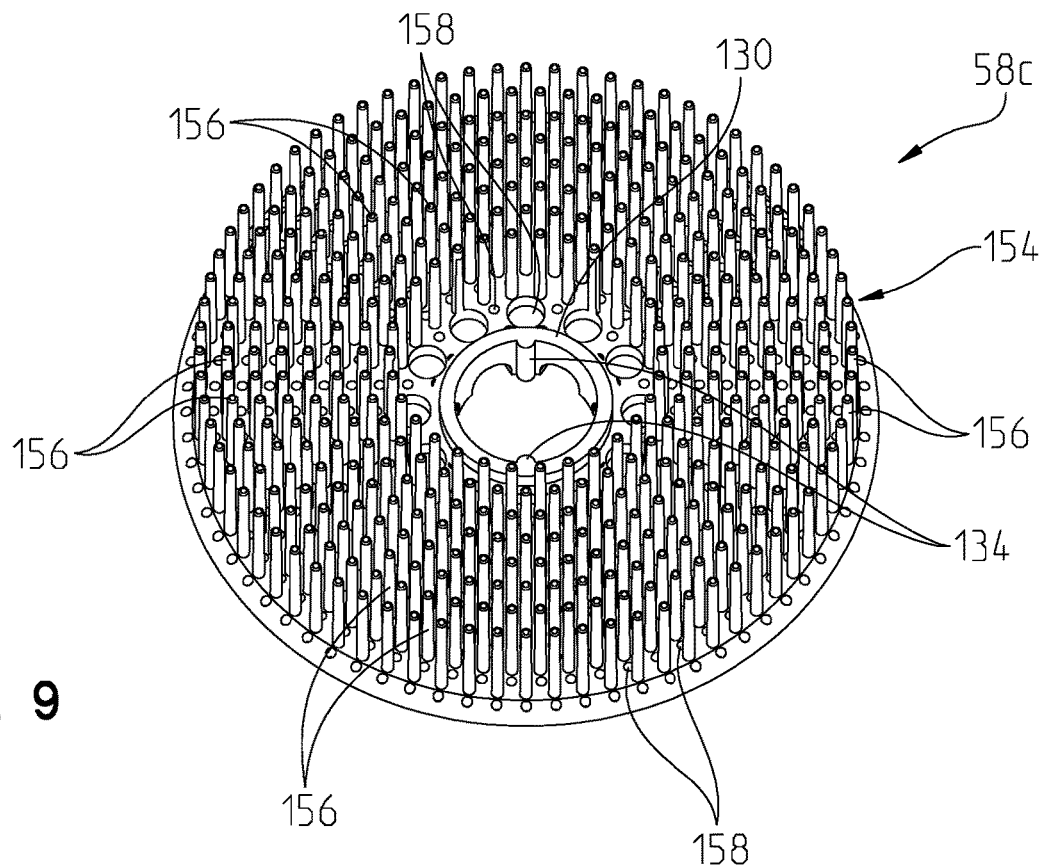
FIG. 9 is a perspective view of a third removable plate of the vessel rinsing apparatus of FIG. 2 in the form of a cleaning brush, with a plurality of second cleaning projections.
Figure 10:
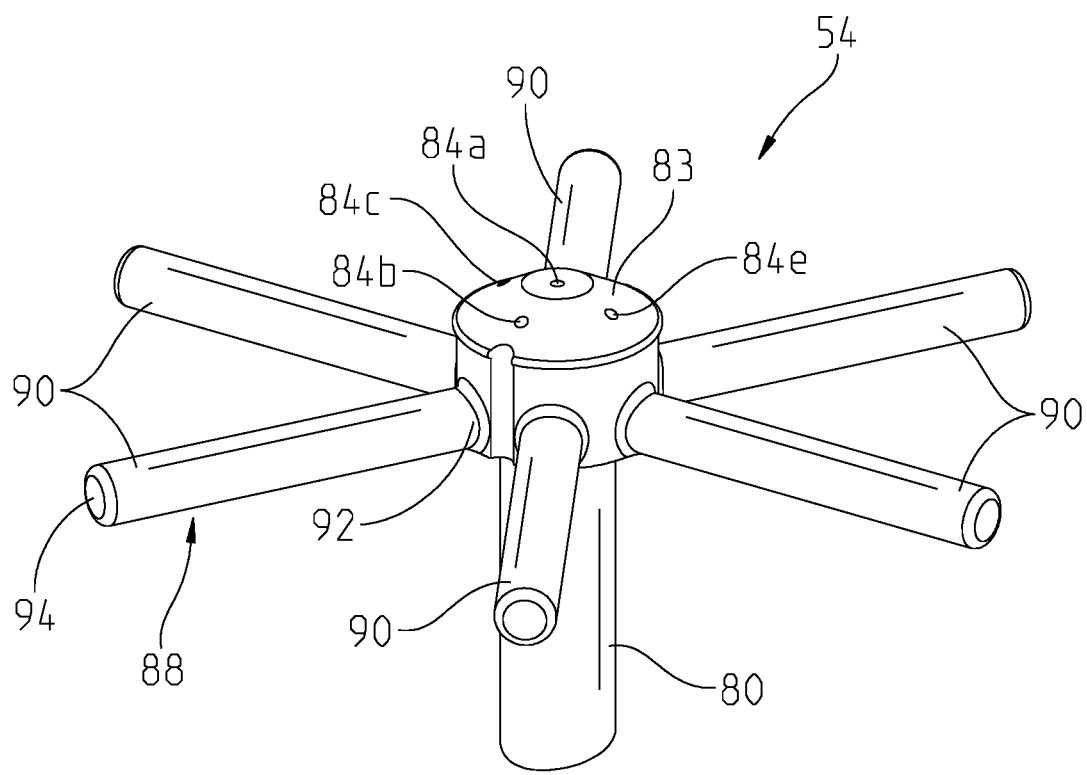
FIG. 10 is a perspective view of a fluid discharge member of the vessel rinsing apparatus of FIG. 2.
Figure 11:
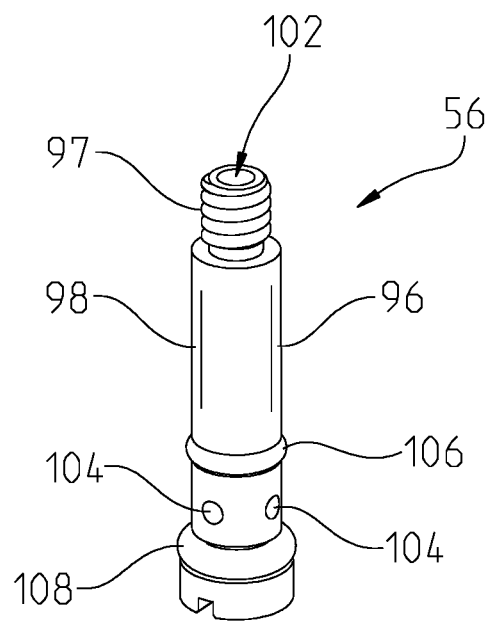
FIG. 11 is a perspective view of a valve shaft of the vessel rinsing apparatus of FIG. 2.

As shown in FIG. 9, a third removable trigger plate 58c may comprise an elastomeric brush 154 similar to that shown in FIG. 8. More particularly, the brush 154 includes a plurality of upwardly extending projections or bristles 156 and a plurality of drain openings 158 positioned intermediate adjacent cleaning projections 156.

Figure 13:
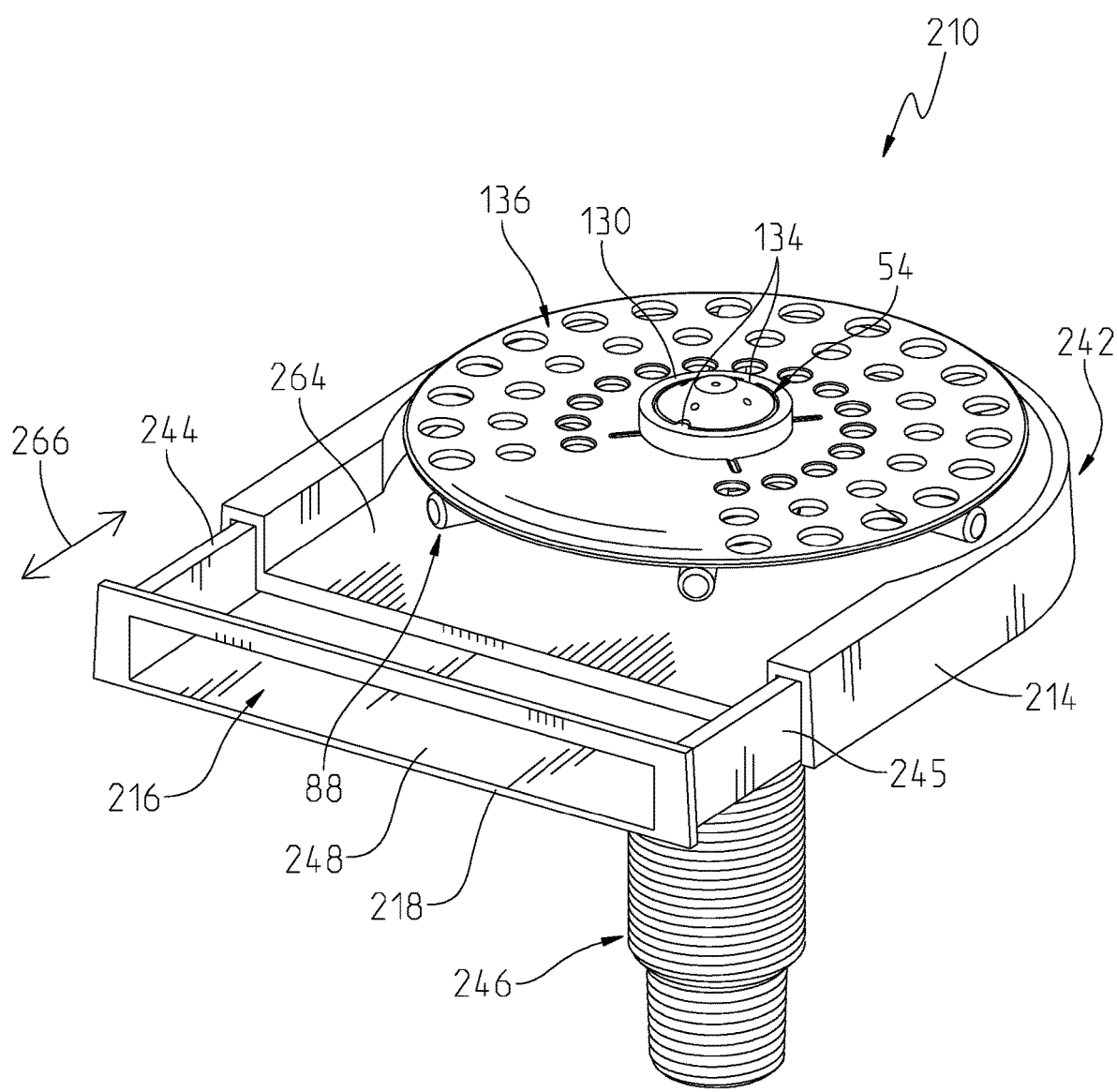
FIG. 13 is a perspective view of another illustrative embodiment vessel rinsing apparatus.

A further illustrative embodiment vessel rinsing apparatus 210 is shown in FIG. 13 as including many of the same elements as the vessel rinsing apparatus 10 detailed above. As such, in the following description, like components are identified with similar reference numbers. The drain channel 216 of the vessel rinsing apparatus 210 includes a movable tray 218 supported by the upper wall 214 of the escutcheon 242. Move particularly, the movable tray 218 includes opposing side walls 244, 245 supported by a lower wall 248. The side walls 244, 245 are slidably received within the upper wall 214 of the escutcheon 242, and the lower wall 248 is slidably received within the upper plate 264 of the mounting base 246. As such, the relative position of the drain channel 216 may be adjusted (as shown by arrows 266) to facilitate wastewater discharge into the sink basin 14. More particularly, the removable tray 218 accommodates different dimensions between the mounting aperture 44c and the sink basin 14.

Figure 14:
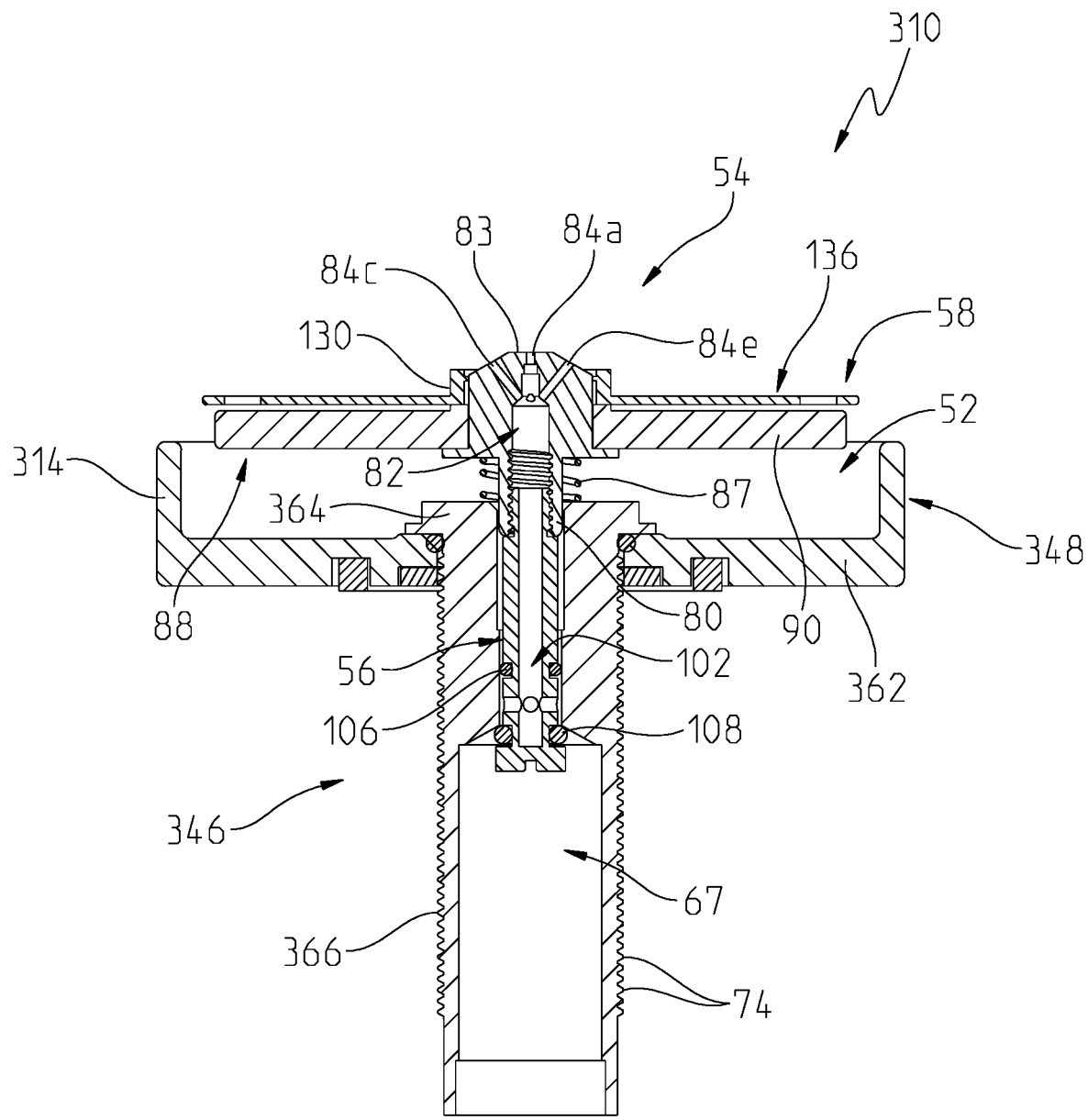
FIG. 14 is a cross-sectional view similar to FIG. 5 of a further illustrative embodiment vessel rinsing apparatus.

Another illustrative embodiment vessel rinsing apparatus 310 is shown in FIG. 14 as including many of the same elements as the vessel rinsing apparatus 10 detailed above. As such, in the following description, like components are identified with similar reference numbers. The vessel rinsing apparatus 310 includes a mounting base 346 including a mounting shank 366 and an upper coupler 364. The escutcheon 348 illustratively includes a lower wall 362 and an upwardly extending wall 314 defining the drain bowl 52.

Although the invention has been described in detail with reference to certain preferred embodiments, variations and modifications exist within the spirit and scope of the invention as described and defined in the following claims.

What is claimed is:

1. A vessel rinsing apparatus comprising:
   a mounting member extending along a longitudinal axis, the mounting member configured to extend though a mounting aperture formed within a mounting deck;

a fluid discharge member including a central body supporting a plurality of nozzles and a trigger, the central body being movable relative to the mounting member;

a valve member operably coupled to the fluid discharge member and configured to control water flow through the central body to the plurality of nozzles in response to movement of the trigger; and a drain bowl operably coupled to the mounting member, the drain bowl including a lower wall, an upwardly extending wall operably coupled to the lower wall, and a drain channel extending through the upwardly extending wall, the drain channel configured to receive water from the drain bowl and discharge water above and into a sink basin supported by the mounting deck.

2. The vessel rinsing apparatus of claim 1, wherein the mounting member comprises a mounting shank defining an opening extending along the longitudinal axis, and the central body of the fluid discharge member is received within the opening of the mounting shank and movable along the longitudinal axis.

3. The vessel rinsing apparatus of claim 2, wherein the lower wall includes an opening through which the mounting shank extends.

4. The vessel rinsing apparatus of claim 1, wherein the drain bowl is defined by an escutcheon.

5. The vessel rinsing apparatus of claim 1, wherein the drain channel slopes away from the fluid discharge member and the drain bowl.

6. The vessel rinsing apparatus of claim 1, wherein the fluid discharge member is in selective fluid communication with an outlet of a faucet mixing valve.

7. The vessel rinsing apparatus of claim 6, further comprising a diverter valve fluidly coupled intermediate the outlet of the faucet mixing valve and the fluid discharge member.

8. The vessel rinsing apparatus of claim 1, wherein the drain channel includes a channel lower wall, opposing side walls, and an undercut formed in a lower surface of the channel lower wall for preventing water flowing through the drain channel from running back toward a rear wall of the sink basin.

9. The vessel rinsing apparatus of claim 1, wherein the drain channel includes a movable tray, such that a length of the drain channel is adjustable.

10. The vessel rinsing apparatus of claim 1, wherein the trigger of the fluid discharge member includes a plurality of arms extending radially outwardly from the central body of the fluid discharge member.

11. A vessel rinsing apparatus comprising:
a drain bowl including a lower wall, an upwardly extending wall operably coupled to the lower wall, and a drain channel extending through the upwardly extending wall, the drain channel configured to receive water from the drain bowl and discharge water above and into a sink basin supported by a mounting deck;
a mounting member operably coupled to the drain bowl, the mounting member configured to couple the drain bowl to the mounting deck;
a fluid discharge member including a central body supporting a plurality of nozzles and a trigger, the central body being movable relative to the mounting member;
a valve member operably coupled to the fluid discharge member and configured to control water flow through the central body to the plurality of nozzles; and wherein the drain channel slopes away from the fluid discharge member and the drain bowl to facilitate water drainage into the sink basin.

12. The vessel rinsing apparatus of claim 11, wherein the mounting member extends along a longitudinal axis, the mounting member configured to extend though a mounting aperture formed within the mounting deck.

13. The vessel rinsing apparatus of claim 12, wherein the mounting member comprises a mounting shank defining an opening extending along the longitudinal axis, and the central body of the fluid discharge member is received within the opening of the mounting shank and movable along the longitudinal axis.

14. The vessel rinsing apparatus of claim 11, wherein the valve member comprises a valve shaft configured to move with the trigger.

15. The vessel rinsing apparatus of claim 11, wherein the drain bowl is defined by an escutcheon.

16. The vessel rinsing apparatus of claim 11, wherein the fluid discharge member is in selective fluid communication with an outlet of a faucet mixing valve.

17. The vessel rinsing apparatus of claim 16, further comprising a diverter valve fluidly coupled intermediate the outlet of the faucet mixing valve and the fluid discharge member.

18. The vessel rinsing apparatus of claim 11, wherein the drain channel includes a channel lower wall, opposing side walls, and an undercut formed in a lower surface of the channel lower wall for preventing water flowing through the drain channel from running back toward a rear wall of the sink basin.

19. The vessel rinsing apparatus of claim 11, wherein the drain channel includes a movable tray, such that a length of the drain channel is adjustable.

20. A fluid delivery device comprising:
a vessel rinsing apparatus including:
a drain bowl including a lower wall and an upwardly extending wall, and a drain channel extending through the upwardly extending wall, the drain channel configured to receive water from the drain bowl and discharge water above and into a sink basin supported by a mounting deck;
a mounting member operably coupled to the drain bowl, the mounting member configured to couple the drain bowl to the mounting deck;
a fluid discharge member including a central body supporting a plurality of nozzles and a trigger, the central body being movable relative to the mounting member; and
a valve member operably coupled to the fluid discharge member and configured to control water flow through the central body to the plurality of nozzles; and
a faucet including:
a delivery spout having a water outlet;
a valve fluidly coupled to the delivery spout, the valve configured to control water flow to the water outlet; and
wherein the fluid discharge member of the vessel rinsing apparatus is in selective fluid communication with the valve of the faucet.

21. The fluid delivery device of claim 20, further comprising a diverter valve fluidly coupled intermediate the valve of the faucet and the fluid discharge member of the vessel rinsing apparatus.

22. The fluid delivery device of claim 20, further comprising:
a removable plate supported by the trigger of the fluid discharge member; and wherein the removable plate comprises one of a strainer including a base and a plurality of circumferentially spaced drain openings, and an elastomeric brush including a plurality of upwardly extending cleaning projections and a plurality of drain openings positioned intermediate adjacent ones of the cleaning projections.

23. The vessel rinsing apparatus of claim 20, wherein the mounting member extends along a longitudinal axis, the mounting member configured to extend though a mounting aperture formed within the mounting deck.

24. The vessel rinsing apparatus of claim 23, wherein the mounting member comprises a mounting shank defining an opening extending along the longitudinal axis, and the central body of the fluid discharge member is received within the opening of the mounting shank and movable along the longitudinal axis.

\* \* \* \* \*